UNITED STATES PATENT OFFICE.

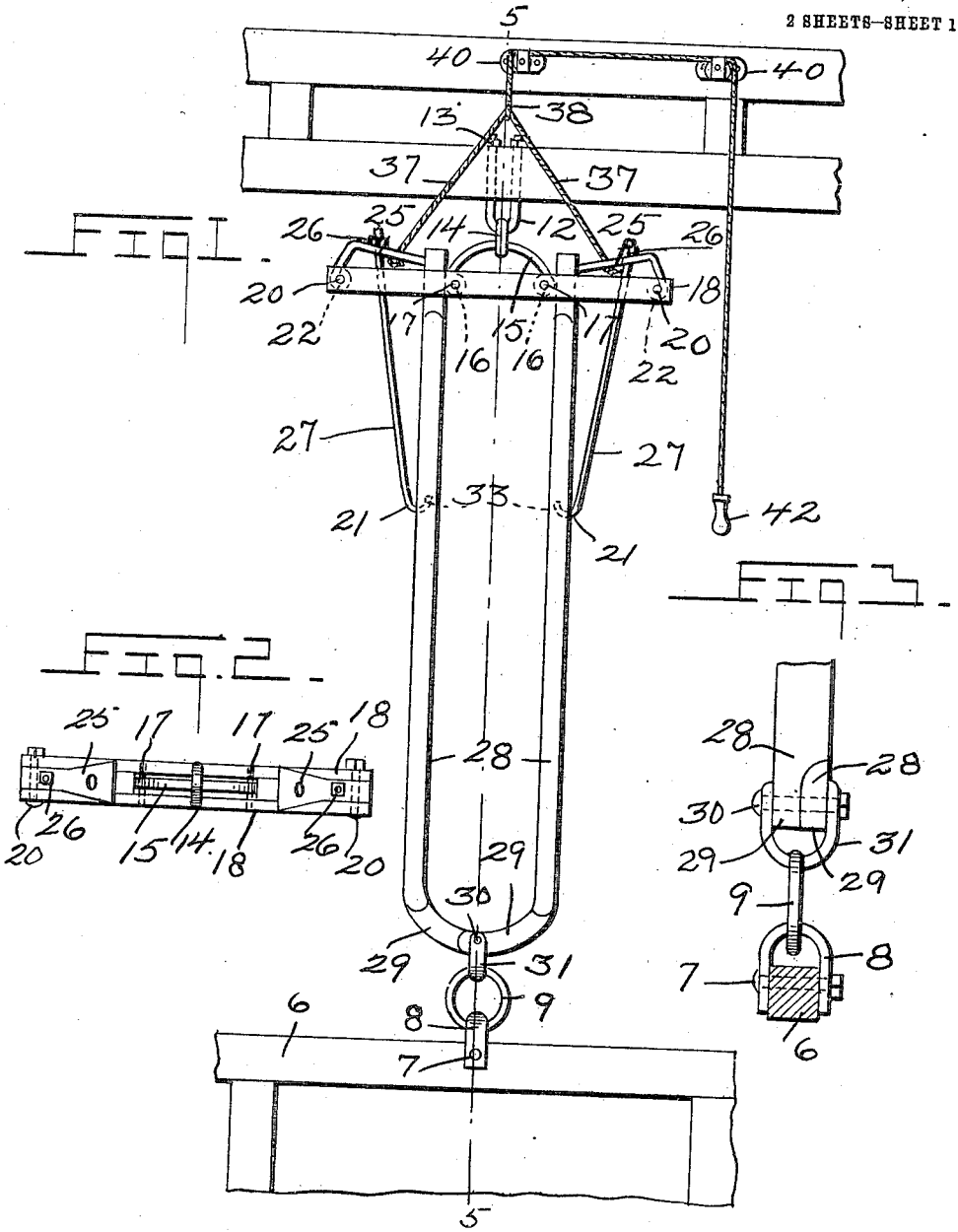

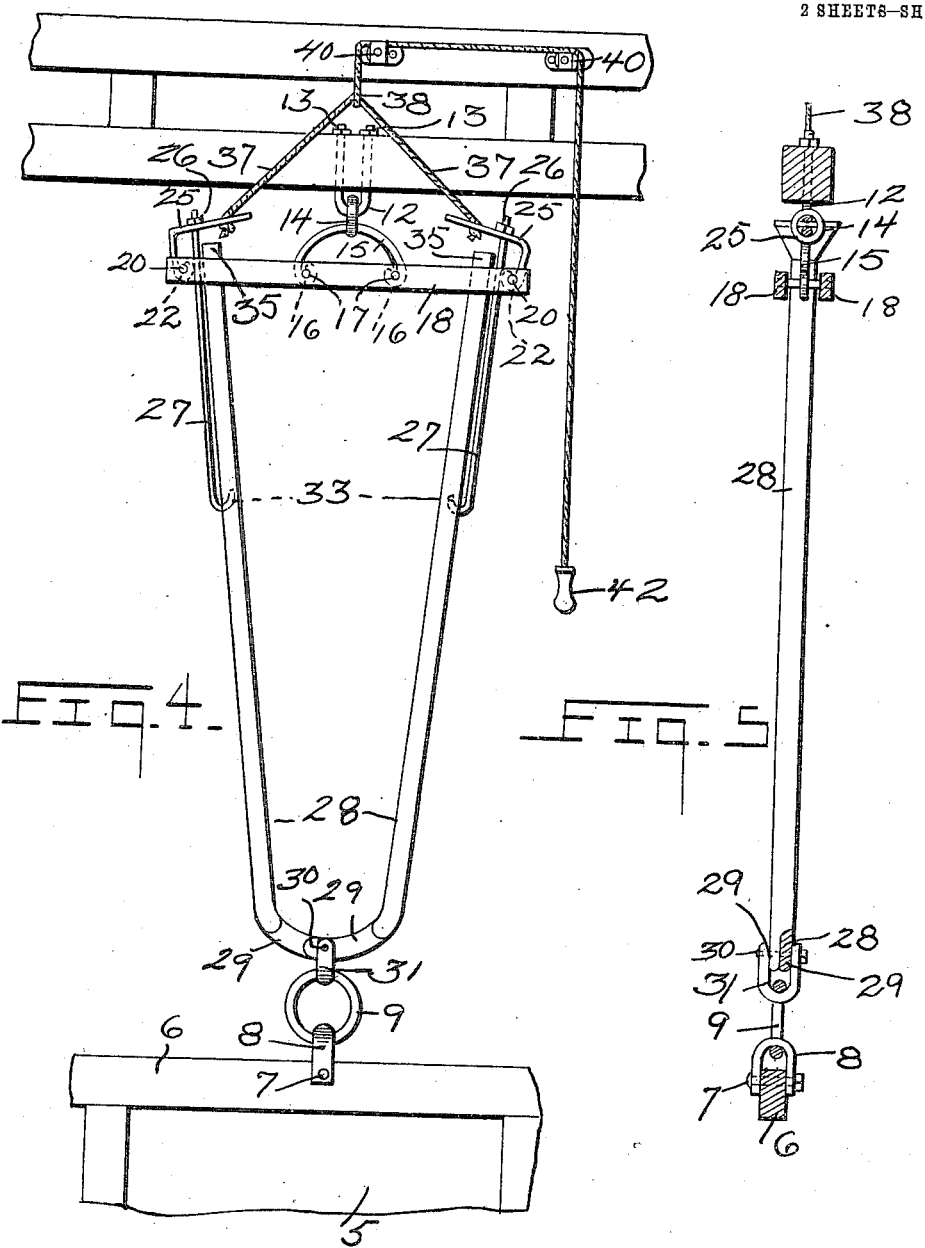

WALTER H. FLEWELL, OF MOUNTAIN HOME, IDAHO.

CATTLE-STANCHION.

971,981. Specification of Letters Patent. Patented Oct. 4, 1910.

Application filed October 25, 1909. Serial No. 524,482.

*To all whom it may concern:*

Be it known that I, WALTER H. FLEWELL, a citizen of the United States, residing at Mountain Home, in the county of Elmore and State of Idaho, have invented certain new and useful Improvements in Cattle-Stanchions, of which the following is a specification.

This invention has relation to certain new and useful improvements in cattle stanchions.

The primary object of my invention is to provide a cattle stanchion so constructed that the stanchions may be held in a yielding open position, permitting the animal to readily insert its head, a simply constructed latch mechanism being carried by said stanchion to hold the same in closed position.

A further object is to provide a stanchion having a latching mechanism actuated by the weight of the stanchion bars to hold said bars in locked position.

With the above and other objects in view, the present invention consists in the combination and arrangement of parts as will be hereinafter more fully described and particularly pointed out in the appended claims, it being understood that changes in the specific structure shown and described may be made within the scope of the claims without departing from the spirit of the invention.

In the drawings forming a portion of this specification, and in which like numerals of reference indicate similar parts in the several views, Figure 1 shows a front elevation of the stanchion in a closed position, Fig. 2 shows a top view of one of the stanchions with portions removed. Fig. 3 shows an end view of the lower connection. Fig. 4 is a view similar to Fig. 1 showing the stanchion in open position, Fig. 5 is a vertical section therethrough, on the line 5—5, shown in Fig. 1.

The aim of my invention is to provide a cattle stanchion which will be simple of construction, durable and positive of operation and within which the animal may be comfortably confined.

In the drawings the numeral 5 designates a manger and 6 the upper edge of the manger carrying the bolt 7, to which is pivotally secured the U-shaped bar 8, which carries the ring 9.

Secured to a suitable beam 10 located above the manger rail 6, is the shackle bolt 12, held by the nuts 13. This bolt 12 carries the ring 14 which ring in turn loosely carries the curved yoke 15, the ends 16 of which are curved to form suitable eyes engaging the supporting bolts 17. Held to these bolts 17, are the supporting bars 18 secured in parallel spaced relation and near their ends these supporting bars carry the bolts 20. The bolts 20 in turn, give pivotal support to the curved lower ends 22 of the approximately L-shaped latch plates 25, which are wide enough so that they will rest upon the upper edges of the supporting bars 18. Passing through suitable apertures within the latch plate 25, are the two similar connecting rods 27, having their lower ends hooked while the upper ends are threaded and carry the adjusting nuts 26.

In connection with my stanchion, I use two similar J-shaped stanchion rods 28, the curved lower ends 29 being flattened and having apertures to carry the bolt 30, which bolt in turn supports the clevis 31, carrying the ring 9 as clearly disclosed in Fig. 3. At a suitable point near their upper ends, each stanchion bar has an opening 33 within which is held the lower hooked end 21 of one of the connecting rods, the upper ends of these stanchion bars 28 being flattened and slidably held between the supporting bars 18, as shown in Fig. 1.

Each latch plate is provided with an opening through which extends an operating strand 37, this strand connecting the two latch plates. Extending midway from this connecting strand 37 is the operating strand 38, passing over the sheaves 40 to a suitable point. This operating strand is provided with a handle 42 conveniently placed.

In the open position of the stanchion, the upper end 35 rests below the shackle plates 25, the shackles being carried by the connecting rods which rods in turn are carried by the latch plates. In this open position the animal can readily insert its head between the stanchion bars 28. In order to lock the stanchion, the operator carries the bars 28 upward so that they will travel inward and be stopped by the curved ends of the yoke 15, in which position the latch plates will drop behind the squared ends 35 of the stanchion bars, as shown in Fig. 1, upon one side. From the foregoing it will be noted that the connecting rods 27, which are carried by the latch plates limit the downward movement of the stanchion bars, while the yoke limits the lateral movement of the stanchion bars in one direction and the latch plate the lateral movement in an opposite direction. By this means I form a gravity actuated latch in that the pendent stanchion bars by virtue of their weight are held in working engagement against the latch plates.

The ring 9 is of such a size, that the stanchion is permitted a swinging movement near the lower end. The upward movement of the stanchion is controlled by the clevis ring 9.

My cattle stanchion can be readily introduced in any cow shed or cattle barn and forms a durable and comparatively inexpensive device.

Having thus described my invention what I claim is:—

1. The combination with a movably held yoke, of two bars secured to said yoke in parallel spaced relation, of latches pivotally secured between the ends of said bars, two pivotally connected stanchion bars having their upper ends slidably held between said parallel bars, a connecting rod extending from each stanchion bar, and means to adjustably secure said connecting rods to said latches.

2. The combination with a manger, of two parallel held bars, of a yoke centrally positioned between said bars, latches secured between the ends of said bars and being directed toward one another, connecting rods adjustably secured to said latches, two pivotally connected stanchion bars held between said bars, said yoke limiting the movement of said stanchion bars in one direction and said latches the movement in an opposite direction, said stanchion bars being carried by said connecting rods, and means to loosely connect the lower ends of said stanchion bars to the manger.

In testimony whereof I affix my signature, in presence of two witnesses.

WALTER H. FLEWELL.

Witnesses:
  W. L. Harvey,
  Anna D. Harvey.